US011532120B2

(12) United States Patent
Cai et al.

(10) Patent No.: US 11,532,120 B2
(45) Date of Patent: Dec. 20, 2022

(54) METHOD AND DEVICE FOR HOLE FILLING OF A POINT CLOUD

(71) Applicant: InterDigital VC Holdings, Inc., Wilmington, DE (US)

(72) Inventors: Kangying Cai, Rennes (FR); Joan Llach Pinsach, Cesson-Sevigne (FR); Celine Guede, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/753,766

(22) PCT Filed: Oct. 2, 2018

(86) PCT No.: PCT/US2018/053931
§ 371 (c)(1),
(2) Date: Apr. 4, 2020

(87) PCT Pub. No.: WO2019/070679
PCT Pub. Date: Apr. 11, 2019

(65) Prior Publication Data
US 2020/0273241 A1 Aug. 27, 2020

(30) Foreign Application Priority Data
Oct. 6, 2017 (EP) .................................... 17306346

(51) Int. Cl.
*G06T 17/00* (2006.01)
*G06T 7/90* (2017.01)

(52) U.S. Cl.
CPC ................ *G06T 17/00* (2013.01); *G06T 7/90* (2017.01); *G06T 2207/10028* (2013.01); *G06T 2210/56* (2013.01)

(58) Field of Classification Search
None
See application file for complete search history.

(56) References Cited

U.S. PATENT DOCUMENTS

| 9,406,116 B2 | 8/2016 | Chang et al. |
| 2015/0134303 A1 | 5/2015 | Chang et al. |
| 2017/0347120 A1* | 11/2017 | Chou .................. H04N 19/147 |

FOREIGN PATENT DOCUMENTS

| CN | 102436654 B | 7/2013 |
| CN | 105788000 A | 7/2016 |
| CN | 106056614 A | 10/2016 |

(Continued)

OTHER PUBLICATIONS

Wang et al. "Filling Holes on Locally Smooth Surfaces Reconstructed from Point Clouds", Image and Vision Computing 25 (2007) 103-113 (Year: 2007).*

(Continued)

*Primary Examiner* — Yingchun He
(74) *Attorney, Agent, or Firm* — Condo Roccia Koptiw LLP

(57) ABSTRACT

This method for hole filling of a point cloud having at least one hole comprises:—detecting (2) boundary points of the point cloud;—grouping (12) the detected boundary points in boundary regions based on their spatial adjacency;—covering (16) each boundary region with at least one plane; and—inserting (18) new points in the point cloud using the planes covering the boundary regions.

21 Claims, 2 Drawing Sheets

(56) References Cited

FOREIGN PATENT DOCUMENTS

CN    106384386 A    2/2017
TW    201520508 A    6/2015

OTHER PUBLICATIONS

Wang et al., "A Hole-Filling Strategy for Reconstruction of Smooth Surfaces in Range Images" Proceedings of the XVI Brazilian Symposium on Computer Graphics and Image Processing (SIBGRAPI'03) (Year: 2003).*

Hoppe et al "Surface reconstruction from unorganized points" In Proceedings of the 19th annual conference on Computer graphics and interactive techniques, pp. 71-78. ACM Press, 1992 (Year: 1992).*

Bendels et al., "Detecting Holes in Point Set Surfaces", 14th International Conference in Central Europe on Computer Graphics, Visualization and Computer Vision 2006 (WSCG'2006), Plzen, Republic, Jan. 30, 2006, 8 pages.

Schnabel, R., "Detecting Holes in Surfaces", Central European Seminar on Computer Graphics (CESCG05), Budmerice, Slovakia, Apr. 1, 2005, 8 pages.

Chalmoviansky et al., "Filling Holes in Point Clouds", Lecture Notes in Computer Science, vol. 2768, Mathematics of Surfaces, 2003, pp. 196-212.

* cited by examiner

METHOD AND DEVICE FOR HOLE FILLING OF A POINT CLOUD

This application is the National Stage Entry under 35 U.S.C. § 371 of Patent Cooperation Treaty Application No. PCT/US2018/053931, filed Oct. 2, 2018, which was published in accordance with PCT Article 21(2) on Apr. 11, 2019, in English, and which claims the benefit of European Patent Application No. 17306346.2, filed Oct. 6, 2017.

FIELD

The present disclosure generally relates to the field of point cloud data sources that represent 3D objects.

More particularly, it deals with the post-processing of point clouds.

Thus, the disclosure concerns a method for hole filling of a point cloud and a corresponding device. It also concerns methods for encoding and decoding a point cloud and corresponding encoder and decoder. It further concerns a computer program implementing the hole filling method of the invention.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A point cloud consists in a set of points usually intended to represent the external surface of a 3D object but also more complex geometries like hair, fur that may not be represented efficiently by other data format like meshes. Each point is defined by its 3D spatial location (x, y and z coordinates in the 3D space), i.e. geometry information, and possibly by other associated attributes, which typically include the color information represented in the RGB or YUV or any other color coordinate system. Other attributes may include a transparency, a reflectance, etc. Geometry can be regarded as one of the attribute data. In the rest of this disclosure, both geometry and other attribute data are considered as attributes of points.

In the following, a colored point cloud is considered, i.e. a set of 6-component points (X, Y, Z, R, G, B) or equivalently (X, Y, Z, Y, U, V) where (X, Y, Z) defines the spatial location of a point in a 3D space and (R, G, B) or (Y, U, V) defines a color of this point.

Colored point clouds may be static or dynamic depending on whether or not the point cloud evolves with respect to time. It should be noticed that in case of a dynamic point cloud, the number of points is not constant but, on the contrary, generally evolves with time. A dynamic point cloud is thus a time-ordered list of sets of points.

Point cloud data sources are found in many applications. Important applications relying on huge point cloud data sources can be found in geographic information systems, robotics, medical tomography and scientific visualization.

Beyond these applications that are more industrial and scientifically oriented, the rise in popularity of inexpensive 3D scanners based on time of flight or other depth sensing technologies, 3D capturing on mobile devices and the rise of cloud based 3D printing are creating a huge demand for large scale interoperable compressed 3D point cloud storage and transmission data formats in the consumer market.

Scanned 3D point clouds often have thousands of points and occupy large amounts of storage space. Additionally, they can be generated at a high rate when captured live from 3D scanners, increasing the data rate even further. Therefore, point cloud compression is critical for efficient networked distribution and storage.

During the capturing of a point cloud, due to surface reflectance properties, occlusions and accessibility limitations, certain areas of the object may be not sampled leading to holes in the resulting point cloud. These holes represent significative missing parts of the 3D point cloud.

Thus, a hole filling technique must be used in order to complete the point cloud.

The prior art works on point cloud hole filling are mainly based on boundary point detection, close boundary loop extraction, and boundary loop filling.

Boundary point detection is performed by projecting the neighboring points of each point of the point cloud to its local tangent plane. Those points whose projected neighboring points cannot form a whole circle are regarded as boundary points. Then, boundary loop extraction is performed by tracing neighboring detected boundary points. When the current tracing boundary meets the boundary point where the current tracing starts, a close boundary loop is found. The resultant closed boundary loops are then filled by adding points in the middle of the boundary loops.

In the prior art, only the closed boundary point loops are regarded as boundaries and will be filled. Therefore, the boundary point detection needs to be accurate. If some of boundary points are missed or some points are wrongly detected as boundary points during the detection step or otherwise, boundary loop cannot be closed.

However, boundary point detection is usually difficult, as no connectivity between points is available. Indeed, the calculation of the local tangent plane is dependent on the choice of the neighborhood. As there is no connectivity information available, it is difficult to define the correct neighborhood of each point in the point cloud. Therefore, boundary point detection is usually difficult.

Also, the boundary loop filling step is usually dependent on complex operations like polynomial fitting, surface reconstruction and triangulation.

Thus, the prior art point cloud hole filling techniques are not suitable for use-cases that require low complexity, such as on-the-fly point cloud rendering and point cloud decoding.

SUMMARY

The present disclosure proposes a solution for improving the situation by providing methods and devices according the enclosed claims.

Accordingly, the present disclosure provides a method for hole filling of a point cloud having at least one hole, comprising:
  detecting boundary points of the point cloud;
  grouping the detected boundary points in boundary regions based on their spatial adjacency;
  covering each boundary region with at least one plane; and
  inserting new points in the point cloud using the planes covering the boundary regions.

Thus, the method of the present disclosure enables a significant reduction of the complexity of the prior art hole filling techniques by using a plane insertion operation. Also, as the present solution does not require to extract closed boundary point loops, accurate boundary point detection is not needed, making the hole filling method of the present disclosure more robust than the prior art solutions.

According to an embodiment, a point of the point cloud is detected as a boundary point using an angle criterion.

This technique for detecting boundary points is described in section 4.2 of the article of Bendels et al. "Detecting holes in point set surfaces", The Journal of WSCG, Vol. 14, WSCG 2006, Jan. 30-Feb. 3, 2006. Its accuracy is not optimal but it is sufficient for the hole filling method of the present disclosure that does not need to extract precise and close boundary point loops.

Advantageously, a point of the point cloud is detected as a boundary point if the largest angle gap between two consecutive local neighbors of the point is larger than a first threshold and the largest angle gap between two consecutive further neighbors of the point is smaller than a second threshold.

Local neighbors means here close neighbors, for instance distance-1 neighbors, while further neighbors are located further, for instance distance-10 neighbors. The second threshold condition allows to avoid detecting false boundary points.

For example, the first threshold is equal to 60 degrees and the second threshold is equal to 120 degrees.

According to an embodiment, the angle gap between consecutive neighbors is the angle gap between the projections of these neighbors on a tangent plane of the point.

Advantageously, at least one boundary point group is defined for each boundary region and each boundary point group is covered by one plane.

Advantageously, the method comprises determining an attribute of each new point.

According to an embodiment, the attribute is the color.

Advantageously, the attribute is determined by interpolation from nearby points of the point cloud.

According to an embodiment, the interpolation is performed in the (R, G, B) color space.

According to another embodiment, the interpolation is performed in the (Y, U, V) color space.

The present disclosure also provides a hole filling device for hole filling a point cloud having at least one hole, comprising:
- a detection module configured to detect boundary points of the point cloud;
- a grouping module configured to group the detected boundary points in boundary regions based on their spatial adjacency;
- a covering module configured to cover each boundary region with at least one plane; and
- an insertion module configured to insert new points in the point cloud using the planes covering the boundary regions.

Advantageously, the modules of the hole filling device are implemented by one or more processors.

According to another aspect, the present disclosure provides a method for coding a point cloud representing a 3D object, comprising a hole filling post-processing according to the present disclosure.

The present disclosure also provides a method for decoding a point cloud representing a 3D object, comprising a hole filling post-processing according to the present disclosure.

The present disclosure also provides an encoder comprising the hole filling device of the present disclosure.

The present disclosure further provides a decoder comprising the hole filling device of the present disclosure.

The methods according to the disclosure may be implemented in software on a programmable apparatus. They may be implemented solely in hardware or in software, or in a combination thereof.

Since these methods can be implemented in software, they can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the hole filling method of the invention.

The diagram of FIG. 1 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
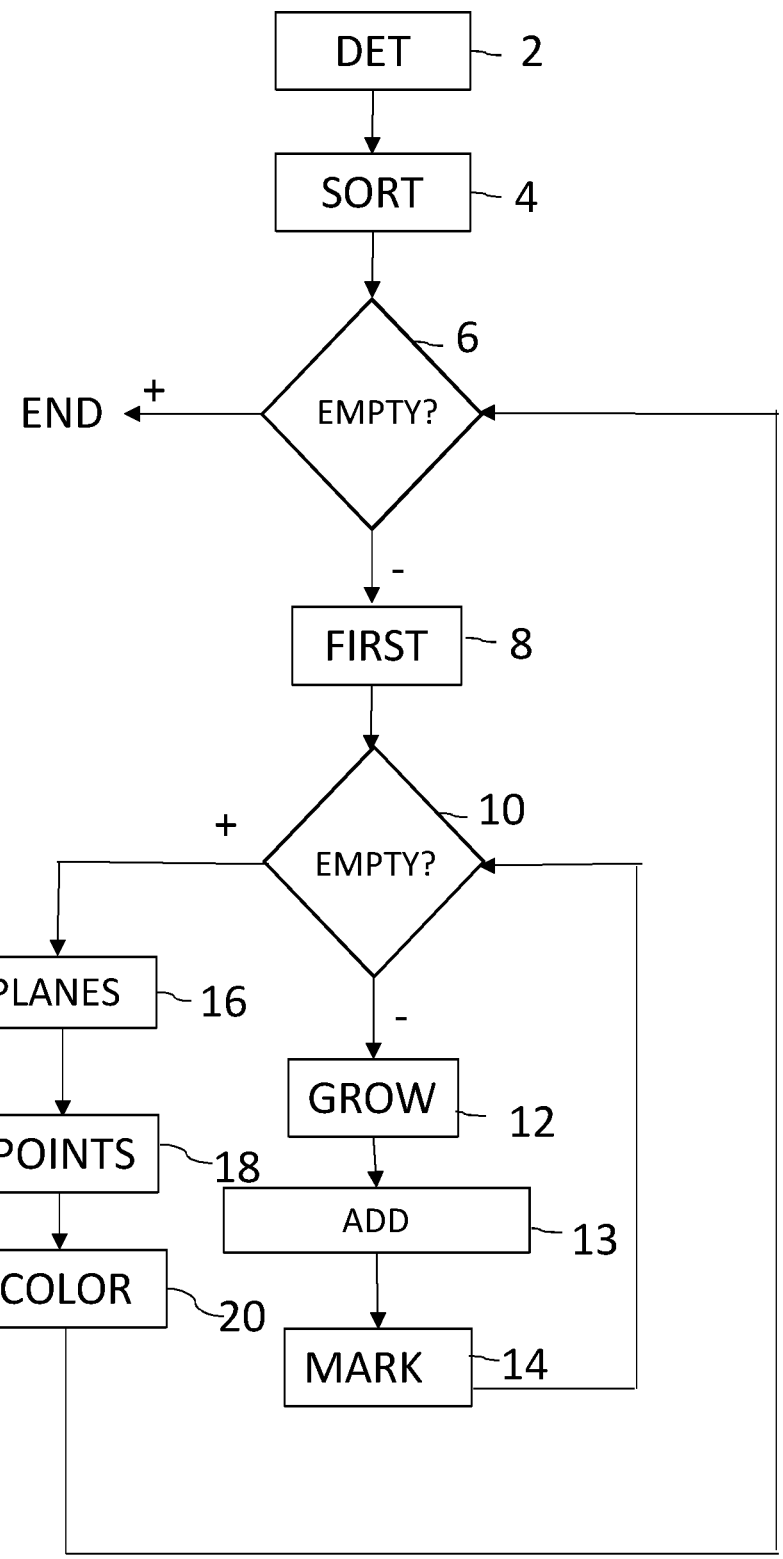
FIG. 1 is a flowchart showing the steps of hole filling of a point cloud, according to an embodiment of the present disclosure.

The method for hole filling of a 3D point cloud according to an embodiment of the present disclosure is illustrated in the flowchart of FIG. 1.

The method starts at step 2 by a detection of the boundary points of the point cloud.

A point of the point cloud is detected as a boundary point using preferably an angle criterion.

Thus, a point P of the point cloud with the largest angle gap g between two consecutive neighbors of P projected on the local tangent plane of P larger than a first threshold T1 are considered as possible boundary points. A possible value of T1 is 60 degrees.

According to one embodiment, for each point P, a mean point M and a covariance matrix C are calculated using the distance-S neighborhood, $\{N_i\}$, of P, where S=1 for example, using the following:

$$M = \frac{1}{n}\sum_{i=1}^{n} N_i$$

$$C = \frac{1}{n}\sum_{i=1}^{n} N_i N_i^T - MM^T$$

where n is the number of P's distance-S neighbors.

Here, the distance-S neighborhood Neigh($x_{Neigh}$, $y_{Neigh}$, $z_{Neigh}$) of a point P($x_p$, $y_p$, $z_p$) is defined by $$\{\text{Neigh}(x_{Neigh}, y_{Neigh}, z_{Neigh})|||x_{Neigh}-x_p|\leq S \&\& |y_{Neigh}-y_p|\leq S \&\& |z_{Neigh}-z_p|\leq S\}$$

Then, the eigenvectors and corresponding eigenvalues of C are calculated. After being normalized and sorted in decreasing order of eigenvalues, the three eigenvectors are chosen as the X, Y and Z axes of a local coordinate system at the point P.

The origin of the local coordinate system is M.

Let's denote the three sorted and normalized eigenvectors as $\vec{v}_{Elgen}^{\,1}$, $\vec{v}_{Elgen}^{\,2}$ and $\vec{v}_{Elgen}^{\,3}$, corresponding to the X, Y and Z axes in the figure.

Each S-neighbor $N_i$ is projected to the XOY plane of the local coordinate system as follows.

Figure 2:
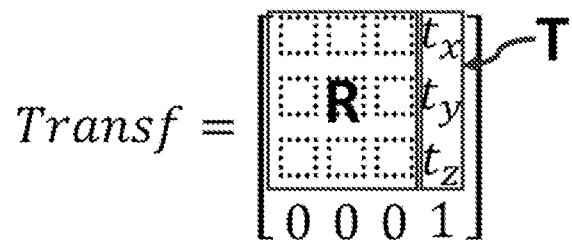
FIG. 2 represents a transformation matrix used for the detection of boundary points, according to an embodiment of the present disclosure.

Firstly, $N_i'(x', y', z')$, the coordinates of $N_i$ represented in the local coordinate system, are calculated by $N_i'(x', y', z')=\text{Transf}*N_i$, where Transf is a 4×4 matrix represented in FIG. 2. Then, $N_i^{Proj}(x', y', 0)$ is the result of projecting $N_i$ to the XOY plane of the local coordinate system.

As it appears in FIG. 2, the matrix Transf includes a 3×3 rotation matrix R and a translation vector T.

According to an embodiment, R is calculated by $R=\vec{q}*\vec{p}$, where $\vec{q}$ and $\vec{p}$ are two quaternions.

The vector $\vec{p}$ represents the rotation which makes the X axis of the world coordinate system to be aligned with the X axis of the local coordinate system. $\vec{p}$ is determined by the rotation axis $\vec{v}_{Rotat}^{\,X}(vx_{Rotat}^X, vy_{Rotat}^X, vz_{Rotat}^X)=\text{CrossProduct}(1,0,0), \vec{v}_{Elgen}^{\,1})$ and the rotation angle $$\theta_{Rotat}^X = \arccos\left(\text{DotProduct}\left((1, 0, 0), \vec{v}_{Elgen}^{\,1}\right)\right).$$

Then, $$\vec{p} = \cos\frac{\theta_{Rotat}^X}{2} + vx_{Rotat}^X \sin\frac{\theta_{Rotat}^X}{2}\cdot i + vy_{Rotat}^X \sin\frac{\theta_{Rotat}^X}{2}\cdot j + vz_{Rotat}^X \sin\frac{\theta_{Rotat}^X}{2}\cdot k.$$

The vector $\vec{q}$ represents the rotation which makes the Y axis of the world coordinate system, after being rotated by $\vec{p}$, to be aligned with the Y axis of the local coordinate system.

$\vec{q}$ is determined by the rotation axis $\vec{v}_{Rotat}^{\,Y}(vx_{Rotat}^Y, vy_{Rotat}^Y, vz_{Rotat}^Y)=\text{CrossProduct}(\vec{p}(0,1,0), \vec{v}_{Elgen}^{\,2})$ and the rotation angle $$\theta_{Rotat}^Y = \arccos\left(\text{DotProduct}\left(\vec{p}*(0, 1, 0), \vec{v}_{Elgen}^{\,2}\right)\right)\cdot \vec{q} =$$
$$\cos\frac{\theta_{Rotat}^Y}{2} + vx_{Rotat}^Y \sin\frac{\theta_{Rotat}^Y}{2}\cdot i + vy_{Rotat}^Y \sin\frac{\theta_{Rotat}^Y}{2}\cdot j + vz_{Rotat}^Y \sin\frac{\theta_{Rotat}^Y}{2}\cdot k.$$

The vector T is calculated by T=M.

Secondly, the angle $\alpha_i$ between $\vec{v}_{Elgen}^{\,1}$ and $\overrightarrow{MN_i^{Proj}}$ is calculated by $\alpha_i = \arctan 2(y', x')$.

Thirdly, all the neighbors $N_i$ are sorted by the angle $\alpha_i$ into a list.

Fourthly, the difference of $\alpha_i$ of two adjacent $N_i$ in the list of all $N_i$ is calculated. If the largest difference, or gap, noted g is larger than a first threshold T1, then P is considered as a possible boundary point.

Then for each possible boundary point P of the point cloud, the following process is carried out.

This process starts by finding further neighbors of the point P. The further neighbors of P are defined as all the points falling on the surface of the cube or sphere which is centered at P and with scale or diameter 2*S'.

$$\{\text{Neigh}(x_{Neigh}, y_{Neigh}, z_{Neigh})|(|x_{Neigh}-x_p|=S' \&\& |y_{Neigh}-y_p|\leq S' \&\& |z_{Neigh}-z_p|\leq S')||$$
$$(|y_{Neigh}-y_p|=S' \&\& |x_{Neigh}-x_p|\leq S' \&\& |z_{Neigh}-z_p|\leq S')||(|z_{Neigh}-z_p|=S' \&\& |x_{Neigh}-x_p|\leq S' \&\& |y_{Neigh}-y_p|\leq S')\}$$

The choice of the value of S' is preferably dependent on the scale of the hole to be filled, for instance of S' may be chosen equal to 10.

Then, all the further neighbors of P are projected on the tangent plane of P and sorted according to their angles around P.

Then, the largest gap g' between two consecutive projected further neighbors is computed. Only points having g' smaller than a second threshold T' are considered as boundary points. A possible value of T' is 120 degrees.

Then, at step 4, all the detected boundary points are sorted into a queue, named all_boundary_point_queue, such that the number of their distance-N neighbors that are also boundary points is increasing. A possible value of N is 2. Indeed, the boundary points with more neighbors, which are also boundary points, are most likely to be located on a big hole.

At step 6, it is checked if all_boundary_point_queue is empty. If yes, the process ends.

Otherwise, the first boundary point is popped out from all_boundary_point_queue and is considered at step 8. A queue associated to this boundary point, named current_boundary_point_queue, is created. Said first boundary point is marked as visited and pushed into current_boundary_point_queue. A new boundary point region, boundary_region_current, is created and set as empty in the beginning.

At step 10, it is checked whether or not current_boundary_point_queue is empty. If this is the case, the process continues to step 16 described later on.

If current_boundary_point_queue is not empty, the boundary point at the front of current_boundary_point_queue, named boundary_point_cur, is popped out from current_boundary_point_queue.

At step 12, boundary_point_cur is added to boundary_region_current.

At step 13, the distance-N neighbors of boundary_point_cur which are also boundary points and not marked as visited yet are added to current_boundary_point_queue.

Then, at step 14, said distance-N neighbors of boundary_point_cur which are also boundary points and not marked as visited yet are marked as visited.

Then, the process goes to step 10 where it is checked if current_boundary_point_queue is empty.

If the queue is empty, the process goes to step 16 at which boundary_region_current is covered with several planes in order to approximate the underlying surface around each boundary region.

Firstly, the covering process starts from a boundary point, noted as boundary-point-start, belonging to boundary_region_current which has not been marked as covered to construct a boundary point group noted as boundary-pointgroup. The boundary-point-start is added to boundary-point-group and boundary-point-start is marked as covered and checked.

Secondly, distance-N neighbors of boundary-point-start which belong to boundary_region_current and have not been marked as covered and checked are considered. Then a mean point MEAN and a normal NORMAL are calculated by applying Principal Component Analysis (PCA) on boundary_point_start and said its distance-N neighbors of boundary_point_start which belong to boundary_region_current and have not been marked as covered and checked.

Then, a new plane PLN is defined by NORMAL*(P−MEAN)=0, where * is vector dot product.

Thirdly, the distance of each of the distance-N neighbors of boundary-point-start, which belong to boundary_region_current and have not been marked as covered and checked, noted as boundary-point-neigh, to PLN is calculated as NORMAL*(boundary-point_neigh−MEAN).

Fourthly, on one side the distance-N neighbors of boundary-point-start which belong to boundary_region_current, which have not been marked as covered and as checked, and which their distances to PLN is less than a user defined threshold THRES_PLANE are added to boundary-point-group and marked as covered and checked. For example, THRES_PLANE=2.0. On the other side, the distance-N neighbors of boundary-point-start which belong to boundary_region_current, have not been marked as covered and as checked, and their distances to PLN is bigger than a user defined threshold THRES_PLANE are marked as checked and are not added to boundary-point-group.

This process is repeated by:
firstly, calculating a new plane PLN_NEW by applying PCA on the points belonging to boundary-point-group and the distance-N neighbors of the points belonging to boundary-point-group, which belong to boundary_region_current and have not been marked as covered and checked;
secondly, calculating the distances of each of the distance-N neighbors of the points belonging to boundary-point-group, which belong to boundary_region_current and have not been marked as covered and checked to PLN_NEW;
thirdly, adding to boundary-point-group and marking as covered and checked the distance-N neighbors of the points belonging to boundary-point-group which belong to boundary_region_current that have not been marked as covered, have not been marked as checked, and their distances to PLN_NEW is less than THRES_PLANE;
fourthly, marking as covered and checked the distance-N neighbors of the points belonging to boundary-point-group which belong to boundary_region_current that have not been marked as covered, have not been marked as checked, and their distances to PLN_NEW is bigger than THRES_PLANE.

The above process is repeated until all the points belonging to boundary_region_current are marked as checked.

Then, it is checked whether all the boundary points belonging to boundary_region_current are marked as covered. If yes, the process goes to step 18. If not, all points belonging to boundary_region_current are marked as unchecked. Then, the plane growing process as described above is repeated starting from a boundary point belonging to boundary_region_current that has not been marked as covered and a new boundary-point-group is defined. The plane growing and new boundary point group creation process are repeated until all the boundary points belonging to boundary_region_current are marked as covered.

At step 18, for each boundary region, the associated planes are transformed to new points to be included in the point cloud.

Firstly, potential new points to be included in the point cloud are determined as follows for each of the determined planes at step 18.

For each boundary point group, the associated plane is defined by applying PCA on all the boundary points belonging to the boundary point group. All the boundary points belonging to the current boundary point group and their distance N' neighbors are projected on the plane associated to the current boundary point group. Then, on the plane, inside a bounding box of all projected points, the unoccupied points constitute one group of the potential new points. A possible value of N' is 4.

Secondly, each group of the potential new points is then projected to the world coordinate system by applying the reverse process of projecting points to local coordinate system described before. Overlapping points are merged together. After merging, the left new points are added to the input point cloud.

Then, at step 20, for each new point $P_{New}$ inserted in the point cloud at step 18, its color is determined by interpolating the color attribute of its nearby existing and newly added points of the point cloud.

The color interpolation may be performed either in the (R, G, B) or in the (Y, U, V) space.

For instance, the interpolation advantageously uses the following formula expressed in the (Y, U, V) space:

$$(Y, U, V)_{P_{New}} = \left((Y, U, V)_{P_{Nearest}} - (Y, U, V)_{P_{UnderSampled}}\right) * \frac{\|P_{New} - P_{UnderSampled}\|}{\|P_{Nearest} - P_{UnderSampled}\|},$$

where $P_{Nearest}$ is the nearest neighbor to $P_{New}$ except $P_{UnderSampled}$.

The same formula can be written in the (R, G, B) space by replacing (Y, U, V) by (R, G, B).

Figure 3:
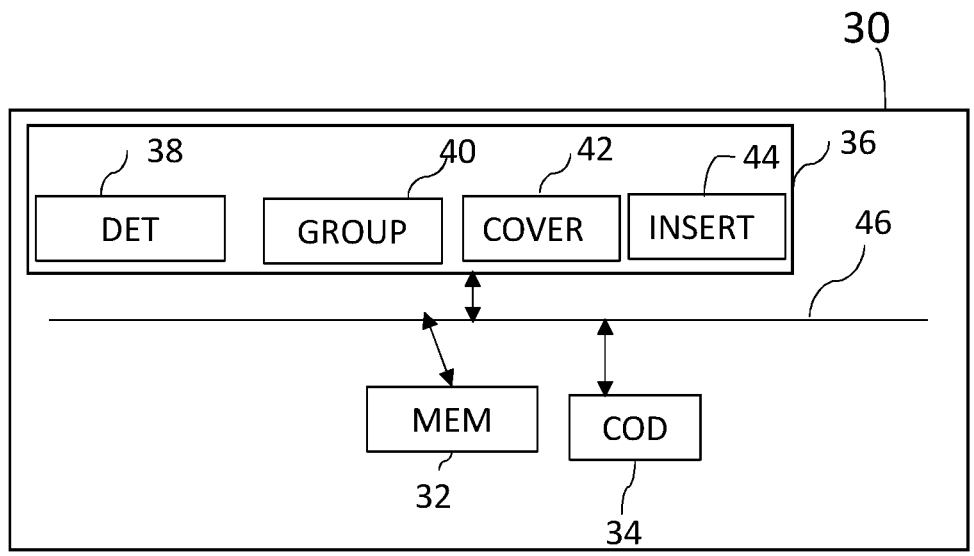
FIG. 3 is a schematic view illustrating an encoder, according to an embodiment of the disclosure.

FIG. 3 is a block diagram of an exemplary embodiment of an encoder 30 implementing the encoding method of a 3D point cloud of the present disclosure.

Advantageously, the encoder 30 includes one or more processors and a memory 32.

The encoder 30 comprises a coding module 34 configured to encode an input 3D point cloud into a bit stream.

According to the present disclosure, the encoder 30 also comprises a hole filling device 36 comprising:
- a detection module 38 configured to detect boundary points of the point cloud;
- a grouping module 40 configured to group the detected boundary points in boundary regions based on their spatial adjacency;
- a covering module 42 configured to cover each boundary region with at least one plane; and
- an insertion module 44 configured to insert new points in the point cloud using the planes covering the boundary regions.

According to the represented embodiment, a bus 46 provides a communication path between various elements of the encoder 30. Other point-to-point interconnection options (e.g. non-bus architecture) are also feasible.

Figure 4:
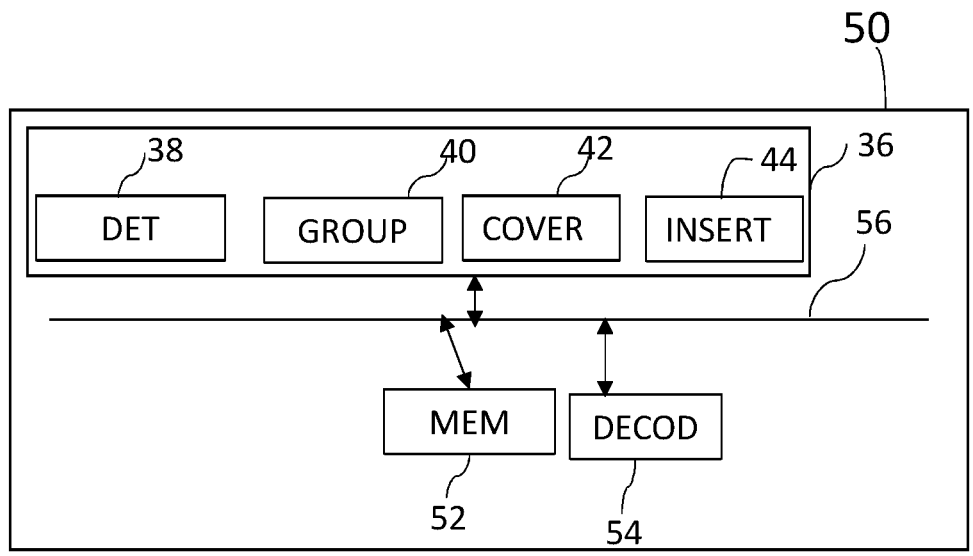
FIG. 4 is a schematic view illustrating a decoder, according to an embodiment of the disclosure.

FIG. 4 is a block diagram of an exemplary embodiment of a decoder 50 implementing the decoder method of the present disclosure.

Advantageously, the decoder 50 includes one or more processors and a memory 52.

The decoder 50 comprises a decoding module 54 configured to decode an input bit stream into a 3D point cloud.

According to the present disclosure, the decoder 50 also comprises the hole filling device 36 described above.

According to the represented embodiment, a bus 56 provides a communication path between various elements of the decoder 50. Other point-to-point interconnection options (e.g. non-bus architecture) are also feasible.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein.

Furthermore, an embodiment of the present invention may not include all of the features described above. Therefore, it is intended that the present invention is not limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

The invention claimed is:

1. A method, comprising:
   detecting boundary points of at least one hole to be filled in a point cloud;
   grouping the detected boundary points into one or more boundary regions based on spatial adjacency of the detected boundary points;
   covering a boundary region of the one or more boundary regions with at least one plane, wherein the at least one plane approximates an underlying surface around the boundary region;
   projecting the detected boundary points of the boundary region and one or more neighbors of the detected boundary points of the boundary region onto the at least one plane covering the boundary region;
   identifying one or more unoccupied positions on the at least one plane, wherein the one or more unoccupied positions are identified without resampling;
   reverse projecting the one or more unoccupied positions identified on the at least one plane to the point cloud to obtain corresponding new points for filling the at least one hole in the point cloud; and
   determining an attribute of the new points of the point cloud.

2. The method of claim 1, wherein the one or more unoccupied positions are identified within a bounding box that surrounds the detected boundary points and the one or more neighbors of the detected boundary points projected onto the at least one plane.

3. The method of claim 1, wherein the attribute is determined by interpolating one or more other points of the point cloud that neighbor the new points.

4. The method of claim 3, wherein a point of the point cloud is detected as a boundary point using an angle criterion.

5. The method of claim 4, wherein a point of the point cloud is detected as a boundary point based on an angle gap between two consecutive local neighbors of the point.

6. The method of claim 5, wherein the angle gap between the two consecutive neighbors is an angle gap between projections of the two consecutive neighbors on a plane.

7. The method of claim 1, wherein the at least one plane is determined by applying a principal component analysis (PCA) to the detected boundary points of the corresponding boundary region and the one or more neighbors of the detected boundary points of the corresponding boundary region.

8. A method for encoding a point cloud representing a 3D object, comprising the method of claim 1.

9. A non-transitory computer readable medium comprising computer-executable instructions to enable a computer to perform the encoding method of claim 8.

10. A method for decoding a point cloud representing a 3D object, comprising the method of claim 1.

11. A non-transitory computer readable medium comprising computer-executable instructions to enable a computer to perform the decoding method of claim 10.

12. An apparatus comprising at least a memory and one or more processors configured to:
   detect boundary points of at least one hole to be filled in a point cloud;
   group the detected boundary points into one or more boundary regions based on spatial adjacency of the detected boundary points;
   cover a boundary region of the one or more boundary regions with at least one plane, wherein the at least one plane approximates an underlying surface around the boundary region;
   project the detected boundary points of the boundary region and one or more neighbors of the detected boundary points of the boundary region onto the at least one plane covering the boundary region;
   identify one or more unoccupied positions on the at least one plane, wherein the one or more unoccupied positions are identified without resampling;
   reverse project the identified one or more unoccupied positions identified on the at least one plane to the point cloud to obtain corresponding new points for filling the at least one hole in the point cloud; and
   determine an attribute of the new points of the point cloud.

13. The apparatus of claim 12, wherein the one or more unoccupied positions are identified within a bounding box that surrounds the detected boundary points and the one or more neighbors of the detected boundary points projected onto the at least one plane.

14. The apparatus of claim 12, wherein the attribute is determined by interpolating one or more other points of the point cloud that neighbor the new points.

15. The apparatus of claim 12, wherein a point of the point cloud is detected as a boundary point using an angle criterion.

16. The apparatus of claim 15, wherein a point of the point cloud is detected as a boundary point based on an angle gap between two consecutive local neighbors of the point.

17. The apparatus of claim 16, wherein the angle gap between the two consecutive neighbors is an angle gap between projections of the two consecutive neighbors on a plane.

18. The apparatus of claim 12, wherein the at least one plane is determined by applying a principal component analysis (PCA) to the detected boundary points of the corresponding boundary region and the one or more neighbors of the detected boundary points of the corresponding boundary region.

19. A decoder comprising the apparatus of claim 12.

20. An encoder comprising the apparatus of claim 12.

21. A non-transitory computer readable medium containing data content generated according to the method of claim 8 or to the encoder of claim 20.

* * * * *